United States Patent [19]

Stuska

[11] Patent Number: 5,176,051
[45] Date of Patent: Jan. 5, 1993

[54] PROCESS FOR MACHINING RADIAL THROUGH-SLOTS IN PISTON-RING GROOVES

[75] Inventor: Gotthard Stuska, Waiblingen, Fed. Rep. of Germany

[73] Assignee: Mahle GmbH, Stuttgart, Fed. Rep. of Germany

[21] Appl. No.: 646,772

[22] PCT Filed: Jun. 2, 1989

[86] PCT No.: PCT/DE89/00363
§ 371 Date: Jan. 10, 1991
§ 102(e) Date: Jan. 10, 1991

[87] PCT Pub. No.: WO90/00692
PCT Pub. Date: Jan. 25, 1990

[30] Foreign Application Priority Data

Jul. 13, 1988 [DE] Fed. Rep. of Germany ....... 3823687

[51] Int. Cl.⁵ .............................................. B23B 1/00
[52] U.S. Cl. ...................................... 82/1.11; 82/114
[58] Field of Search ................. 82/114, 128, 129, 904, 82/1.11; 409/161; 29/38 B

[56] References Cited

U.S. PATENT DOCUMENTS 2,967,745  3/1960  Stevens ................................ 303/44
3,656,766  4/1972  Geffroy .............................. 277/136
4,867,020  9/1989  Compton et al. ................. 82/114 X

FOREIGN PATENT DOCUMENTS 3213807  10/1983  Fed. Rep. of Germany .

OTHER PUBLICATIONS

European Search Report Copy of article from "Technica", Issue 25/26, pp. 2277–2313, FIG. 12.

Primary Examiner—Z. R. Bilinsky
Attorney, Agent, or Firm—Collard & Roe

[57] ABSTRACT

A method for machining radial through-slots into a wall of a piston-ring groove which separates the ring groove from the piston interior. A piston for an internal combustion engine is provided in which the wall has varying thickness and is thinnest in the pressure and counterpressure sides of the piston. A cutting tool is held in a fixed position. The piston is rotated about its longitudinal axis. The rotating piston is brought into engagement with the fixed cutting tool so that slots of a predetermined axially height are machined into the ring-groove wall over the entire circumference of the piston. Also, radial through-slots are created only in the pressure and counterpressure sides of the piston.

1 Claim, 1 Drawing Sheet

PROCESS FOR MACHINING RADIAL THROUGH-SLOTS IN PISTON-RING GROOVES

BACKGROUND OF THE INVENTION

1. Field of the Invention

The present invention relates to a process for machining slots through a piston-ring groove into the interior of the piston. More particularly, it relates to machining slots in the pressure and counterpressure sides of the piston where the walls are thinnest in the radial direction.

2. The Prior Art

Radial through-slots machined through the piston ring groove of a piston are known, for example, from CH-Z (Swiss journal) "Technica. 1980 Issue 25/26, page 2277-2313, FIG. 12." These slots generally have the purpose of separating the piston head from the shaft in the areas of the pressure and counterpressure sides of the piston. If the piston ring grooves of a plunger piston for internal combustion motors are placed exclusively in the piston head above the shaft, the stated radial through-slots will be located in the lowest ring groove adjacent to the piston shaft. The oil strip ring is then placed into this ring groove. Some oil rings are held under tension by a tubular spring placed radially on the inside of the oil strip ring. If these tubular springs have a low coil diameter, for example, less than 2 mm, the tubular springs may jam into the radial through-slots. In order to prevent this, the radial through-slots must be constructed with a lesser height than the coil diameter of the tubular spring.

With the previous manufacturing methods, it was frequently not possible to guarantee adherence to close tolerances of an axially low through-slot. This especially applies to cast pistons. These pistons are cast in such a way that when the groove is machined in, a slot occurs in the area of the pressure and counter-pressure sides. In these cases, it is not always possible to maintain close tolerances for the through-slots with any certainty.

SUMMARY OF THE INVENTION

It is an object of the present invention to produce the required through-slots with high accuracy in the most efficient manner possible.

This object is accomplished by a method for machining radial through-slots into a wall of a piston ring groove which separates the ring groove from the piston interior. A piston for an internal combustion engine is provided in which the wall has varying thickness and is thinnest in the pressure and counterpressure sides of the piston. A cutting tool is held in a fixed position. The piston is rotated about its longitudinal axis. The rotating piston is brought into engagement with the fixed cutting tool so that slots of a predetermined axial height are machined into the ring groove wall over the entire circumference of the piston. Also, radial through-slots are created only in the pressure and counterpressure sides of the piston.

The cutting tool so machines material out of the radially closed base of this ring groove over its entire circumference, at a height which can be preset in the direction of the piston axis, by way of the shape of the cutting tool, specifically to a radial depth which is just sufficient to achieve the radial through-slots in the areas provided for them, without simultaneously breaking through the other circumference areas, via which the piston areas adjacent to the top and bottom flanks of the ring groove remain connected.

This process has the advantages that the through-slots to be formed in the area of the pressure and counterpressure sides of the piston can be produced in simple manner, on a lathe, using a cutting tool, and with an extremely high accuracy.

BRIEF DESCRIPTION OF THE DRAWINGS

An embodiment is shown in which half of a piston is shown in cross-section.

DETAILED DESCRIPTION OF PREFERRED EMBODIMENTS

Figure 1:
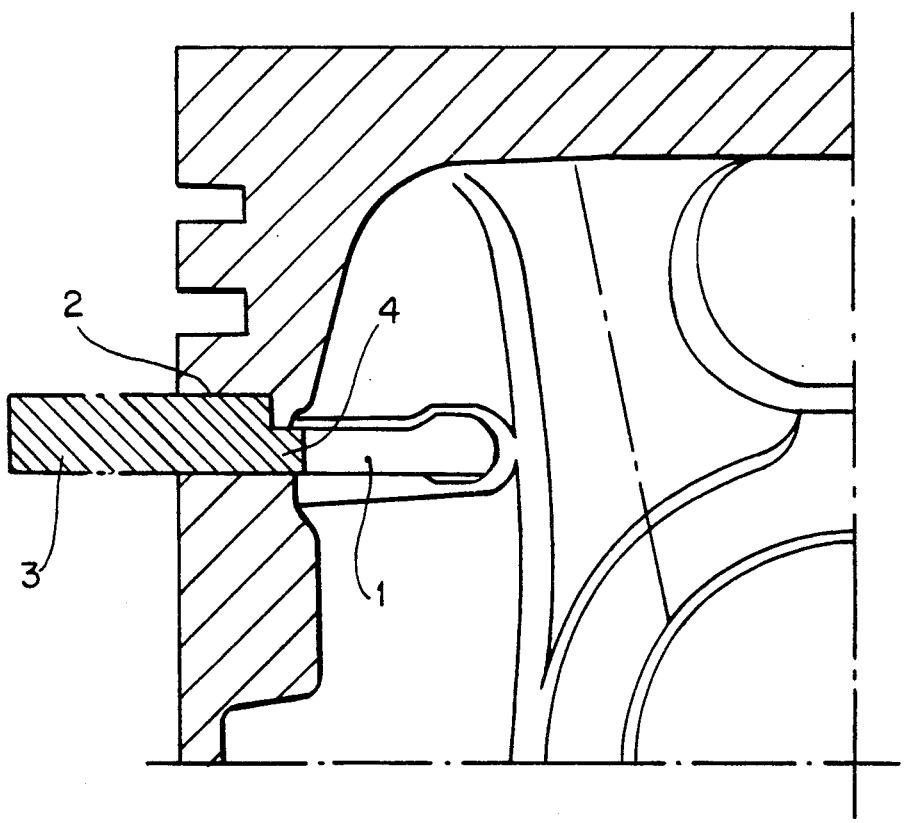

Turning now in detail to the drawing, the interior shape of the piston is cast in its finished form. In those areas in which a through-slot 1 is to be machined, the wall thickness of a ring groove 2 in the radial direction is slight enough to be penetrated by a cutting tool 3 while the piston is rotating. Cutting tool 3 can be formed in such a way that it fills the entire axial height of ring groove 2 and only has a narrower cutting projection 4 in its front area, which is reduced to the height of the through-slot to be produced. With the length of cutting projection 4, through-slots 1 are achieved, for one thing, and for another, suitably narrow ring groove continuations are produced in those circumference areas in which no complete through-slots are to be made. These narrow ring groove continuations have no technical function in those areas and are merely present there in order to be able to rotate the piston past cutting tool 3.

With the process according to the invention, through-slots 1 with axial heights as low as about 0.5-0.8 mm can be produced on pistons with a cast interior shape, with great accuracy.

I claim:

1. A method for machining radial through-slots into a wall of a piston ring groove, which wall separates the ring groove from the piston interior, comprising the steps of:
   providing a piston for an internal combustion engine in which the wall has varying thickness and is thinnest in the pressure and counter-pressure sides of the piston;
   holding a cutting tool in a fixed position;
   rotating the piston about its longitudinal axis; and
   engaging the rotating piston with the fixed cutting tool so that slots of a predetermined axial height are machined into the ring groove wall over the entire circumference of the piston and radial through-slots are created only in the pressure and counter-pressure sides of the piston;
   by way of the shape of the cutting tool specifically to a radial depth which is just sufficient to achieve the radial through-slots in the areas provided for them, without simultaneously breaking through the other circumference areas, via which the piston area adjacent to the top and bottom flanks of the ring groove remain connected.

* * * * *